US 11,212,554 B2

(12) United States Patent
Rath et al.

(10) Patent No.: US 11,212,554 B2
(45) Date of Patent: *Dec. 28, 2021

(54) METHOD AND APPARATUS FOR LOW-COMPLEXITY BI-DIRECTIONAL INTRA PREDICTION IN VIDEO ENCODING AND DECODING

(71) Applicant: InterDigital VC Holdings, Inc., Wilmington, DE (US)

(72) Inventors: Gagan Bihari Rath, Cesson-Sevigne (FR); Fabrice Le Leannec, Cesson-Sevigne (FR); Franck Galpin, Cesson-Sevigne (FR); Fabien Racape, Los Altos, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,103

(22) Filed: Dec. 7, 2020

(65) Prior Publication Data

US 2021/0092443 A1   Mar. 25, 2021

Related U.S. Application Data

(63) Continuation of application No. 16/612,519, filed as application No. PCT/EP2018/064050 on May 29, 2018, now Pat. No. 10,893,294.

(30) Foreign Application Priority Data

May 31, 2017   (EP) .................................... 17305639

(51) Int. Cl.
  H04N 19/00   (2014.01)
  H04N 19/593   (2014.01)
  H04N 19/176   (2014.01)

(52) U.S. Cl.
  CPC ......... H04N 19/593 (2014.11); H04N 19/176 (2014.11)

(58) Field of Classification Search
  CPC ..... H04N 19/593; H04N 19/176; H04N 19/70
  See application file for complete search history.

(56) References Cited

U.S. PATENT DOCUMENTS

2014/0133565 A1 * 5/2014 Lee ..................... H04N 19/13
  375/240.14
2017/0150180 A1 * 5/2017 Lin ..................... H04N 19/59
(Continued)

*Primary Examiner* — Zhihan Zhou
(74) *Attorney, Agent, or Firm* — Xiaoan Lu

(57) ABSTRACT

A method for video decoding is disclosed. A directional intra prediction mode is decoded for a block of a picture, the directional intra prediction mode having a direction. Based on the directional intra prediction mode, a first predictor and a second predictor for a sample in the current block are accessed, the first and second predictors being on a line at least approximating the direction. A sample value of the sample is predicted by interpolation using the first and second predictors, responsive to a difference between the second and first predictors, wherein the difference is scaled by at least a ratio that is based on a location of the sample in the block, and wherein a denominator of the ratio is a power of two regardless of the location of the sample. The sample of the block is reconstructed based on the predicted sample value.

20 Claims, 11 Drawing Sheets

(56) References Cited

U.S. PATENT DOCUMENTS

| | | | |
|---|---|---|---|
| 2017/0310959 A1* | 10/2017 | Chen | H04N 19/11 |
| 2017/0353719 A1* | 12/2017 | Liu | H04N 19/176 |
| 2017/0353730 A1* | 12/2017 | Liu | H04N 19/105 |
| 2018/0309984 A1* | 10/2018 | Son | H04N 19/593 |
| 2020/0045322 A1* | 2/2020 | Ye | H04N 19/167 |
| 2020/0077086 A1* | 3/2020 | Lee | H04N 19/70 |

\* cited by examiner

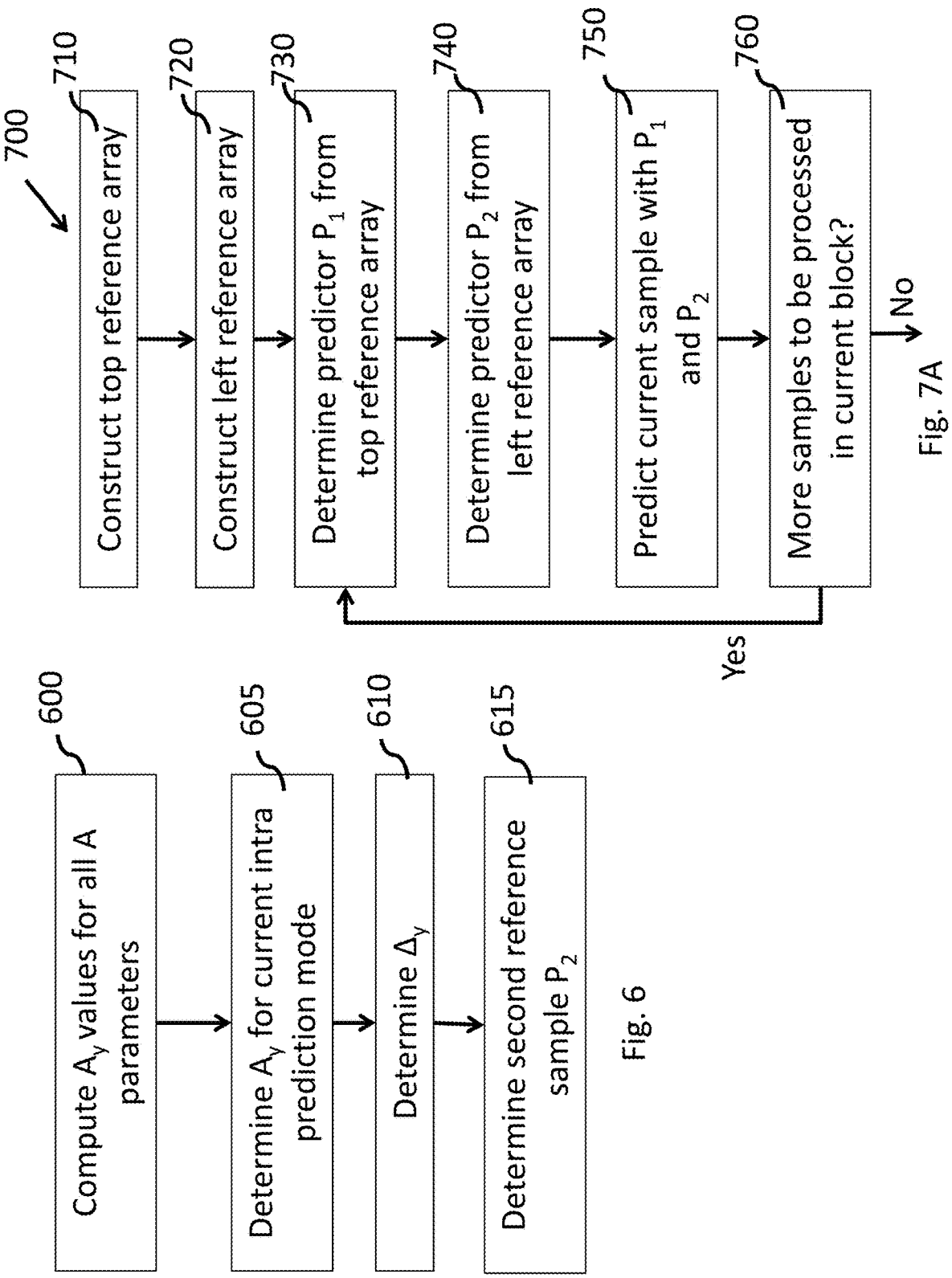

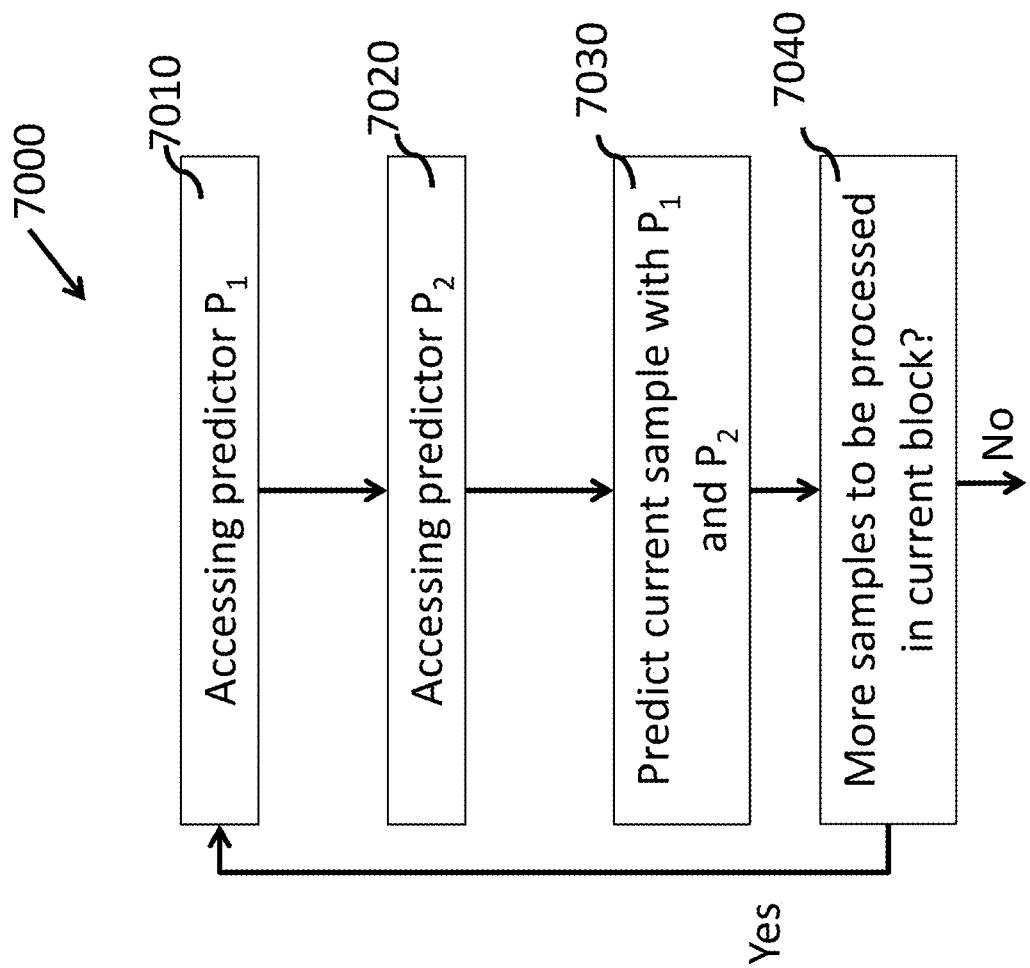

METHOD AND APPARATUS FOR LOW-COMPLEXITY BI-DIRECTIONAL INTRA PREDICTION IN VIDEO ENCODING AND DECODING

CROSS-REFERENCE TO RELATED APPLICATIONS

This application is a Continuation of U.S. application Ser. No. 16/612,519, filed Nov. 11, 2019, which is a National Phase entry under 35 U.S.C. § 371 of International Application No. PCT/EP2018/064050, filed May 29, 2018, which claims the benefit of European Patent Application 17305639.1, filed May 31, 2017, which is incorporated by reference herein in its entirety.

TECHNICAL FIELD

At least one of the present embodiments generally relates to a method and an apparatus for video encoding and decoding, and more particularly, to a method and an apparatus for low-complexity bi-directional intra prediction.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

Intra prediction in video compression refers to the spatial prediction of a block of pixels using information from causal neighbor blocks, that is, neighboring blocks in the same frame which have already been encoded or decoded. Intra prediction is a powerful coding tool since it allows for high compression efficiency in INTRA frames, as well as in INTER frames. Therefore, intra prediction has been included as a core coding tool in many video compression standards including, but not limited to, H.264/AVC and H.265/HEVC. Many of the existing video coding standards use fixed-point operations implementations of coding tools.

SUMMARY

According to a general aspect of at least one embodiment, a method for video decoding is presented, comprising: decoding a directional intra prediction mode for a current block of a picture in a video, said directional intra prediction mode having a direction; accessing, based on said directional intra prediction mode, a first predictor for a sample, the sample being within said current block; accessing, based on said directional intra prediction mode, a second predictor for said sample, said first and second predictors being on a line at least approximating said direction, predicting a sample value of said sample, by using said first and second predictors; and decoding said sample of said current block based on said predicted sample value.

According to another general aspect of at least one embodiment, a method for video encoding is presented, comprising: accessing a directional intra prediction mode for a current block of a picture in a video, said directional intra prediction mode having a direction; accessing, based on said directional intra prediction mode, a first predictor for a sample, the sample being within said current block; accessing, based on said directional intra prediction mode, a second predictor for said sample, said first and second predictors being on a line at least approximating said direction, predicting a sample value of said sample, by using said first and second predictors; and encoding said sample of said current block based on said predicted sample value.

According to at least one embodiment, bi-directional intra prediction is proposed for predicting samples of a current block, thus rate/distortion cost of encoding a video is improved.

According to at least one embodiment, at least accessing a second predictor and/or predicting the sample value using the first and second predictors uses approximations suitable for fixed-point operations implementation. Such an embodiment closely matches the theoretical interpolation model and bi-directional intra prediction extension. Therefore, bi-directional intra prediction implementation is suitable for low-complexity encoding. Furthermore, according to at least one embodiment of the present disclosure, simple approximations are proposed so as to avoid division operations when accessing the second predictor and/or when predicting the sample from the first and second predictors.

According to another general aspect of at least one embodiment, an apparatus for video decoding is presented, comprising at least a memory and one or more processors, wherein the one or more processors are configured to: decode a directional intra prediction mode for a current block of a picture in a video, said directional intra prediction mode having a direction; access, based on said directional intra prediction mode, a first predictor for a sample, the sample being within said current block; access, based on said directional intra prediction mode, a second predictor for said sample, said first and second predictors being on a line at least approximating said direction, predict a sample value of said sample, by using said first and second predictors; and decode said sample of said current block based on said predicted sample value.

According to another general aspect of at least one embodiment, an apparatus for video encoding, comprising at least a memory and one or more processors, wherein the one or more processors are configured to: access a directional intra prediction mode for a current block of a picture in a video, said directional intra prediction mode having a direction; access, based on said directional intra prediction mode, a first predictor for a sample, the sample being within said current block; access, based on said directional intra prediction mode, a second predictor for said sample, said first and second predictors being on a line at least approximating said direction, predict a sample value of said sample, by using said first and second predictors; and encode said sample of said current block based on said predicted sample value.

In one embodiment, said sample is substantially located on said line in said direction, between said first and second predictors, said second predictor being substantially at an intersection of said line in said direction and an array of reference samples.

According to another embodiment, accessing said second predictor comprises: determining a displacement value along said array of reference samples, based on said direction, using integer-based operations, and identifying said second predictor based on said displacement value. According to this embodiment, integer-based operations are used rather than floating-point operations. Thus, memory storage is saved as well as power consumptions for performing operations.

According to another embodiment, said displacement value is determined as a function of an angle parameter associated to said direction. For example, the angle parameter is derived from the intra prediction mode.

According to another embodiment, determining said displacement value comprises using a pre-calculated table of magnitude values computed for each angle parameter associated to a direction of a directional intra prediction mode from a set of available directional intra prediction modes.

According to another embodiment, said array of reference samples corresponds to vertical neighbor samples of said current block, said displacement value being a vertical displacement value.

According to another embodiment, wherein said displacement value is determined taking into account an horizontal coordinate of said sample in said current block.

According to another embodiment, said magnitude values are determined by $$\frac{1024}{A},$$

where A is an angle parameter associated to a direction of a directional intra prediction mode.

According to another embodiment, said direction is a negative direction and wherein determining said displacement value takes into account a width of said current block.

According to another embodiment, predicting said sample values comprises interpolating between values of said first and second predictors.

According to another embodiment, interpolation between values of said first and second predictors is based on a location of said sample in said current block, and wherein interpolation uses an approximation of a ratio wherein a denominator of said ratio is a power of two. Therefore, division in the interpolation operation can thus be implemented by bit-shifting operations.

According to another embodiment, said interpolation of values comprises multiplying a difference value between said second predictor and said first predictor values by a ratio, wherein said ratio is computed based at least on W+H where W is a width of said current block and H is a height of said current block.

According to another embodiment, said ratio is approximated by $$\frac{1+y}{W+H},$$

where y is a coordinate of said sample along a vertical axis in said current block.

According to another embodiment, said direction is a positive direction and wherein said ratio is approximated by $$\frac{W+y-x}{H+W},$$

where y and x are respectively coordinates of said sample along a vertical axis and an horizontal axis in said current block.

According to another embodiment, said direction is a positive direction and wherein said ratio is approximated by $$\frac{W+H+y-x}{2\times(H+W)},$$

where y and x are respectively coordinates of said sample along a vertical axis and a horizontal axis in said current block.

According to another embodiment, said direction is a negative direction and wherein said ratio is approximated by $$\frac{1+y+x}{H+W},$$

where y and x are respectively coordinates of said sample along a vertical axis and a horizontal axis in said current block.

According to another embodiment, said first predictor is determined from one or more reference samples of an above or left neighbor block of said current block.

According to another general aspect of at least one embodiment, a video signal is formatted to include coded data for at least a current block of a picture of a video, said current block being encoded based on a directional intra prediction mode, said directional intra prediction mode having a direction, at least one sample of said current block being encoded based on a predicted sample value obtained by using a first predictor and a second predictor accessed based on said directional intra prediction mode, said first predictor and said second predictor being on a line at least approximating said direction.

Said video signal is further formatted to include for the current block, a bi-directional flag indicating whether the current block uses uni-directional intra prediction or bi-directional intra prediction.

One or more of the present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide a method and apparatus for transmitting the bitstream generated according to the methods described above.

BRIEF DESCRIPTION OF THE DRAWINGS

FIG. 6 illustrates an exemplary method for localizing a second reference sample in bi-directional intra prediction, according to an embodiment.

FIG. 7A illustrates an exemplary method of performing bi-directional intra prediction in video encoding or decoding, according to an embodiment. FIG. 7B illustrates an exemplary method of performing bi-directional intra prediction in video encoding or decoding, according to another embodiment.

DETAILED DESCRIPTION

The following two applications are hereby incorporated by reference in their entirety for all purposes: (i) EP application titled "Method and apparatus for bi-directional intra prediction for negative directions in video encoding and decoding", having application number EP17305629.2, filed on 31 May 2017, and (ii) EP application titled "Method and apparatus for intra prediction with interpolation", having application number EP17305635.9, filed on 31 May 2017.

Figure 1:
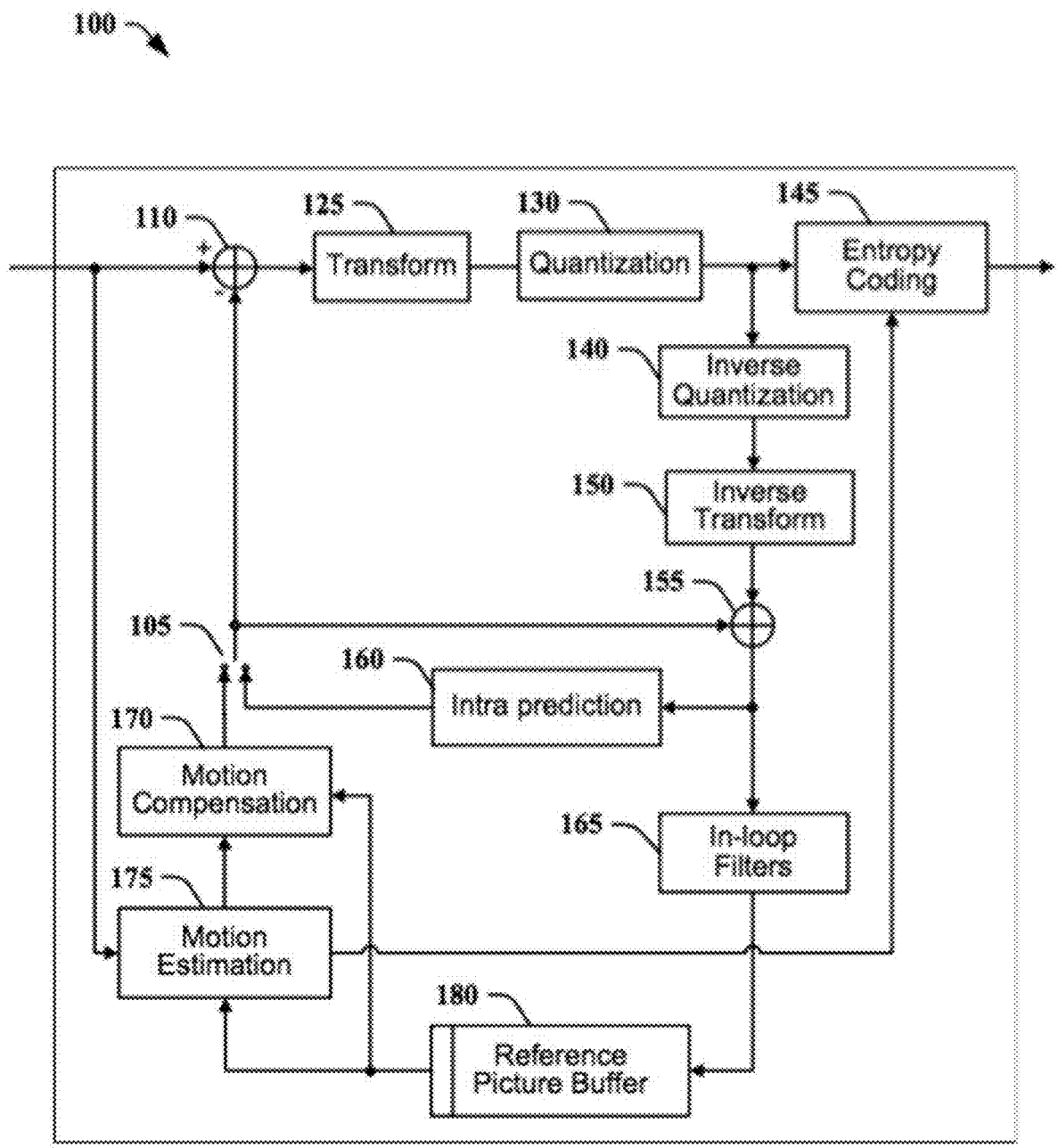
FIG. 1 illustrates a block diagram of an exemplary HEVC (High Efficiency Video Coding) video encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 2A:
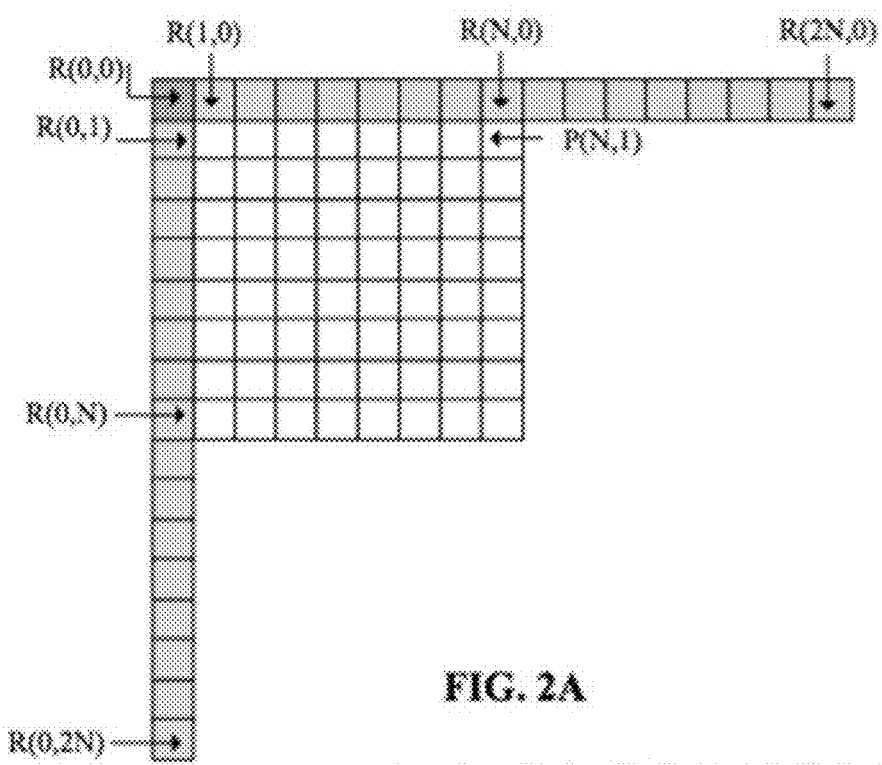
FIG. 2A is a pictorial example depicting the HEVC reference sample generation.

The intra prediction process in HEVC includes three steps: (1) reference sample generation, (2) intra sample prediction, and (3) post-processing of predicted samples. Exemplary HEVC reference samples are illustrated in FIG. 2A, where the reference pixel value at coordinate (x, y), with respect to one pixel above and to the left of the above-left corner of the current block, is indicated by R(x,y), and the predicted sample value at coordinate (x, y) of the current block is indicated by P(x,y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs is not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

Figure 2B:
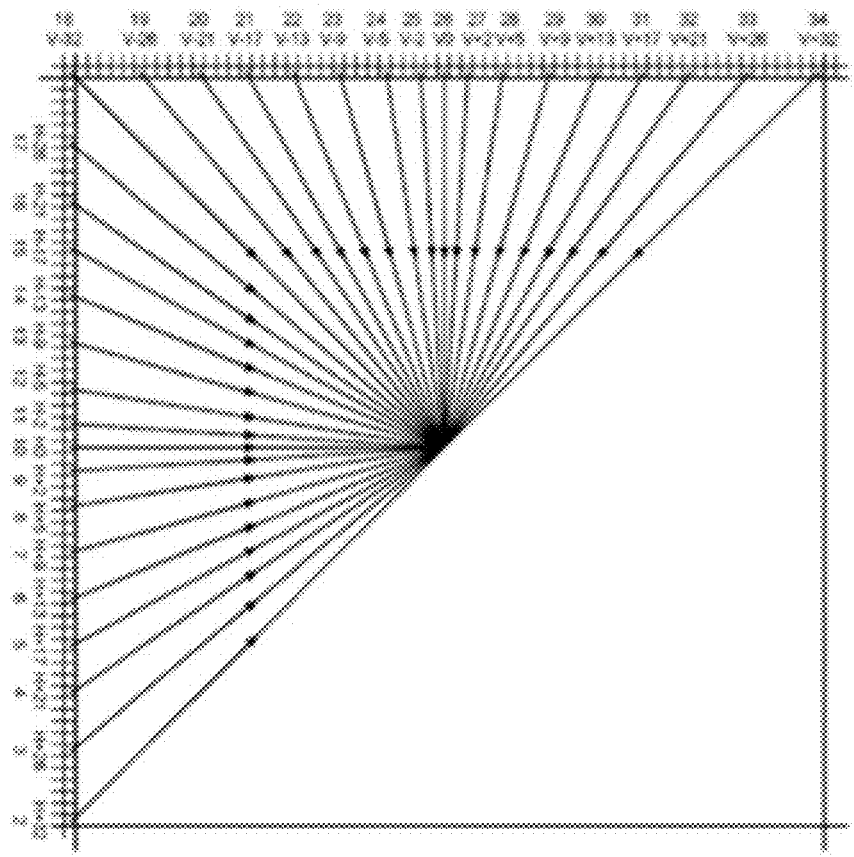
FIG. 2B is a pictorial example depicting intra prediction directions in HEVC.

The next step, i.e., the intra sample prediction, consists of predicting the pixels of the target CU based on the reference samples. In order to predict different kinds of content efficiently, HEVC supports a range of prediction methods. In particular, planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 2B, wherein the numbers (i.e., 2, 3, . . . , 34) denote intra prediction mode indices. The prediction modes 2-17 are denoted as horizontal prediction modes (H−26 to H+32), as the predominant sources of prediction is in horizontal direction. The modes 18-34 are denoted as vertical prediction modes (V−32 to V+32) accordingly. "H" and "V" in FIG. 2B are used to indicate the horizontal and vertical directionalities, respectively, while the numeric part of the identifier indicates the pixels' displacement (also referred to as "angle parameter") at $\frac{1}{32}$ pixel fractions.

Table 1 shows the relationship between the directional prediction mode and the angle parameter A as specified by HEVC.

TABLE 1

| | Horizontal directions | | | | | | | | | | | | | | | | |
|---|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 15 | 16 | 17 | |
| A | 32 | 26 | 21 | 17 | 13 | 9 | 5 | 2 | 0 | −2 | −5 | −9 | −13 | −17 | −21 | −26 | |
| | Vertical directions | | | | | | | | | | | | | | | | |
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

The directions with non-negative displacements (i.e., H0 to H+32 and V0 to V+32) are also denoted as positive directions, and the directions with negative displacements (i.e., H−2 to H−26 and V−2 to V−32) are also denoted as negative directions. Positive prediction direction may also be defined as direction having positive A value, and negative prediction direction may be defined as direction having negative A values.

As shown in FIG. 2B, the defined angular directions have a sample accuracy of $\frac{1}{32}$. That is, the interval between two pixels, either in horizontal or vertical directions, is divided into 32 subintervals. As described above, the defined directions can be distinguished as either vertical or horizontal. The prediction modes in horizontal directions use either only left reference samples, or some left and some top reference samples. Similarly, the prediction modes in vertical directions use either only top reference samples, or some top and some left reference samples. The horizontal positive directions from H0 to H+32 use only the left reference samples for prediction. Similarly, the vertical positive directions from V0 to V+32 use only the top reference samples for prediction. Negative horizontal and vertical directions (H−2 to H−26 and V−2 to V−32) use reference samples both on the left and on the top for prediction.

In HEVC reference code, a reference array is first constructed using the top and left reference samples. For vertical predictions, the reference array is horizontal (i.e., a row of reference samples) and for horizontal predictions, the reference array is vertical (i.e., a column of reference samples). For the modes with positive directions, the reference array is simply the top or left reference samples depending on the direction:

$$\text{topRef}[x]=R(x,0),\ 0\leq x\leq 2N,\ \text{for vertical predictions} \qquad (1)$$

$$\text{leftRef}[y]=R(0,y),\ 0\leq y\leq 2N,\ \text{for horizontal predictions} \qquad (2)$$

For the modes with negative directions, the reference array needs pixels from both the top and left reference arrays. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array in the prediction direction:

$$\text{topRef}[x]=R(0,(x*B+128)\!>\!>8),\ -N\leq x<0,\ \text{for vertical predictions}$$

$$\text{leftRef}[y]=R((y*B+128)\!>\!>8,0),\ -N\leq y<0,\ \text{for horizontal predictions}$$

where >> denotes a bit shift operation to the right and B represents the inverse angle parameter corresponding to angle parameter A. FIG. 4C illustrates the construction of the top reference array for negative directions with the mapping of samples from the left reference array.

Once the reference array is constructed, the prediction at any pixel position (x, y) inside the target PU is obtained by projecting the pixel position to the reference array along the selected direction and interpolating a value for the same at $\frac{1}{32}$ pixel accuracy. The predicted sample value is computed by interpolating between two closest reference samples:

$$P(x,y)=((32-f)*\text{topRef}[x+i]+f*\text{topRef}[x+i+1]+16) \!>\!>5),\ 1\leq x,y\leq N,\ \text{for vertical predictions} \qquad (3)$$

$$P(x,y)=((32-f)*\text{leftRef}[y+i]+f*\text{leftRef}[y+i+1]+16) \!>\!>5),\ 1\leq x,y\leq N,\ \text{for horizontal predictions}, \qquad (4)$$

where i and f denote the integer part and the fractional part of the projected displacement from the pixel location (x, y). If Δ denotes the projected displacement, then Δ=x*A, for horizontal predictions, and Δ=y*A, for vertical predictions.

i=Δ>>5, f=Δ & 31 where & denotes a bitwise AND operation. Note that, if f=0, that is, there is no fractional part, and the predicted sample value is equal to the reference array sample value in the direction of prediction.

Some of the prediction modes such as the DC mode and directly horizontal (i.e., mode 10) and directly vertical modes (i.e., mode 26) may cause discontinuity at the CU boundaries of the prediction samples. Therefore, such prediction modes are followed by a post-processing step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Since there are multiple intra prediction modes available, the decoder needs the mode information to form the prediction for an intra-coded CU. The encoder encodes the mode information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
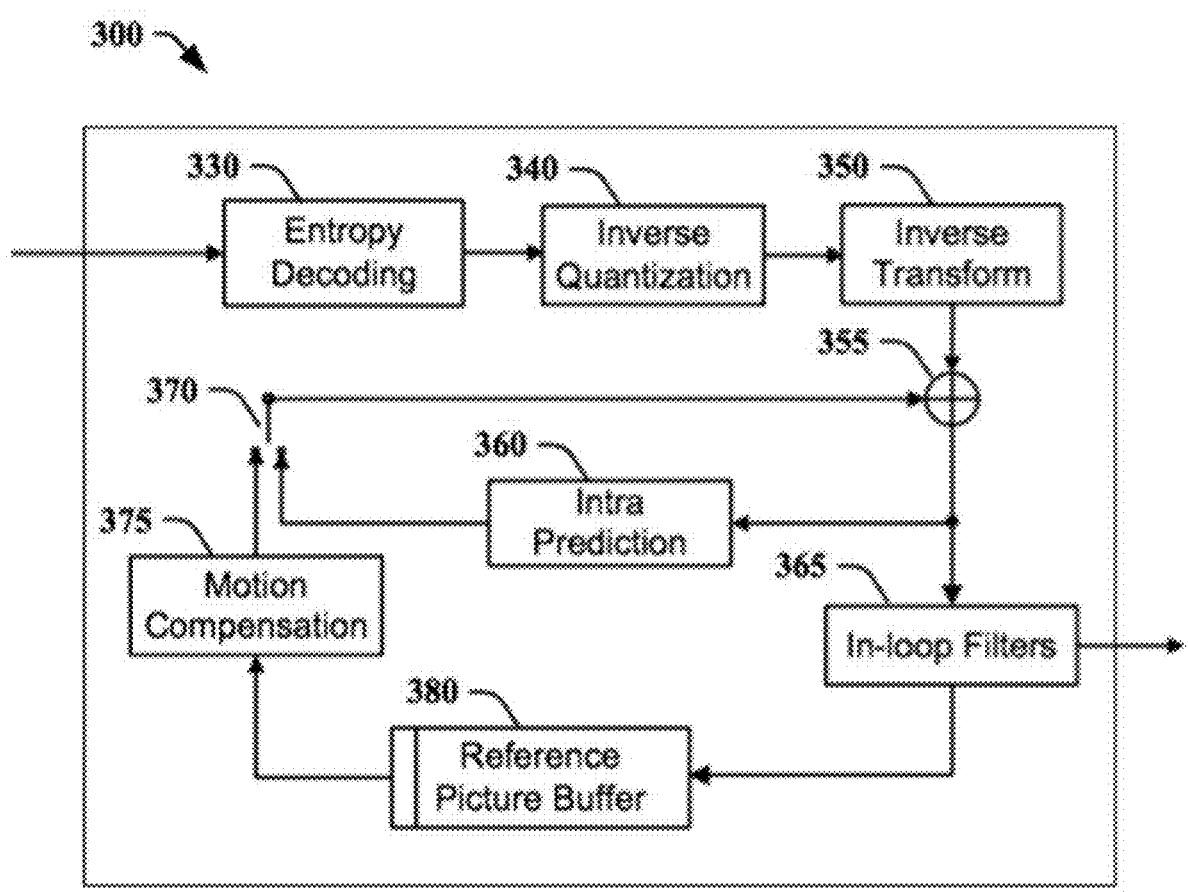
FIG. 3 illustrates a block diagram of an exemplary HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

As described above, in HEVC, encoding of a frame of video sequence is based on a block structure. A frame is divided into square coding tree units (CTUs), which may undergo quadtree (QT) splitting to multiple coding units based on rate-distortion criteria. Each CU is either intra-predicted, that is spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 directional prediction modes (indexed as modes 2-34).

In JEM (Joint Exploration Model) under study by the Joint Video Exploration Team (JVET) for designing the next generation video compression standard, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components. For ease of notation, the CUs or blocks resulting from a binary tree partition are also referred to as binary tree (BT) CUs or blocks, and the CUs or blocks resulting from a quadtree partition are also referred to as quadtree (QT) CUs or blocks.

As possible improvements to HEVC, JEM 3.0 uses 65 directional intra prediction modes in addition to the planar and DC modes. The modes are numbered from 2 to 66 in the increasing order, in the same fashion as done in HEVC from 2 to 34. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of angular structures with proposed larger block sizes. Corresponding to the higher number of modes, there is a higher number of angle parameter A values.

In addition to square CUs, JEM can also have rectangular CUs because of the QTBT structure. In this case, for positive directions, the reference array is constructed as follows:

$$\text{topRef}[x] = R(x, 0), \ 0 \le x \le W + H, \text{ for vertical predictions}$$

$$\text{leftRef}[y] = R(0, y), \ 0 \le y \le W + H, \text{ for horizontal predictions}$$

where W and H denote the width and the height of the target CU, respectively. For negative directions, the reference array is constructed as above for positive indices. For negative indices, the projections of the left reference array (for vertical predictions) or top reference array (for horizontal predictions) are used:

$$\text{topRef}[x] = R(0, (x*B+128) >> 8), \ -H \le x < 0, \text{ for vertical predictions}$$

$$\text{leftRef}[y] = R((y*B+128) >> 8, 0), \ -W \le y < 0, \text{ for horizontal predictions.}$$

The prediction process basically remains the same as in HEVC. The pixel values are computed as:

$$P(x,y)=((32-f)*\text{topRef}[x+i]+f*\text{topRef}[x+i+1]+16)>>5,$$
$$1\le x\le W, 1\le y\le H, \text{ for vertical predictions} \quad (5)$$

$$P(x,y)=((32-f)*\text{leftRef}[y+i]+f*\text{leftRef}[y+i+1]+16)$$
$$>>5, 1\le x\le W, 1\le y\le H, \text{ for horizontal predictions.} \quad (6)$$

As described above, HEVC and JEM aim to model different directional structures by different angular prediction models. Depending on the directionality, some prediction directions are termed positive and some are termed negative. The prediction models work well when the intensity values do not change too much along the prediction direction. However, in natural imagery, the intensity values on objects often undergo changes due to several reasons. For example, because of a color property of the object itself, lighting, depth, motion, etc., the intensity values over a PU can undergo changes that cannot be sufficiently modelled using pixel repetition. This is especially true when the PU size is large, for example, JEM has proposed to use CTU sizes up to 256. Therefore, we may consider other prediction models that may model the intensity change more efficiently.

Bi-Directional Intra Prediction

According to the embodiment of the intra prediction method disclosed above, a sample of a target block is predicted by a first reference sample contained in a first reference array constructed as disclosed above. The embodiment is directed to bi-directional intra prediction wherein a sample of a target block is predicted by a first reference sample and a second reference sample wherein the second reference sample is obtained from a second reference array different from the first reference array.

Figures 4A, 4B:
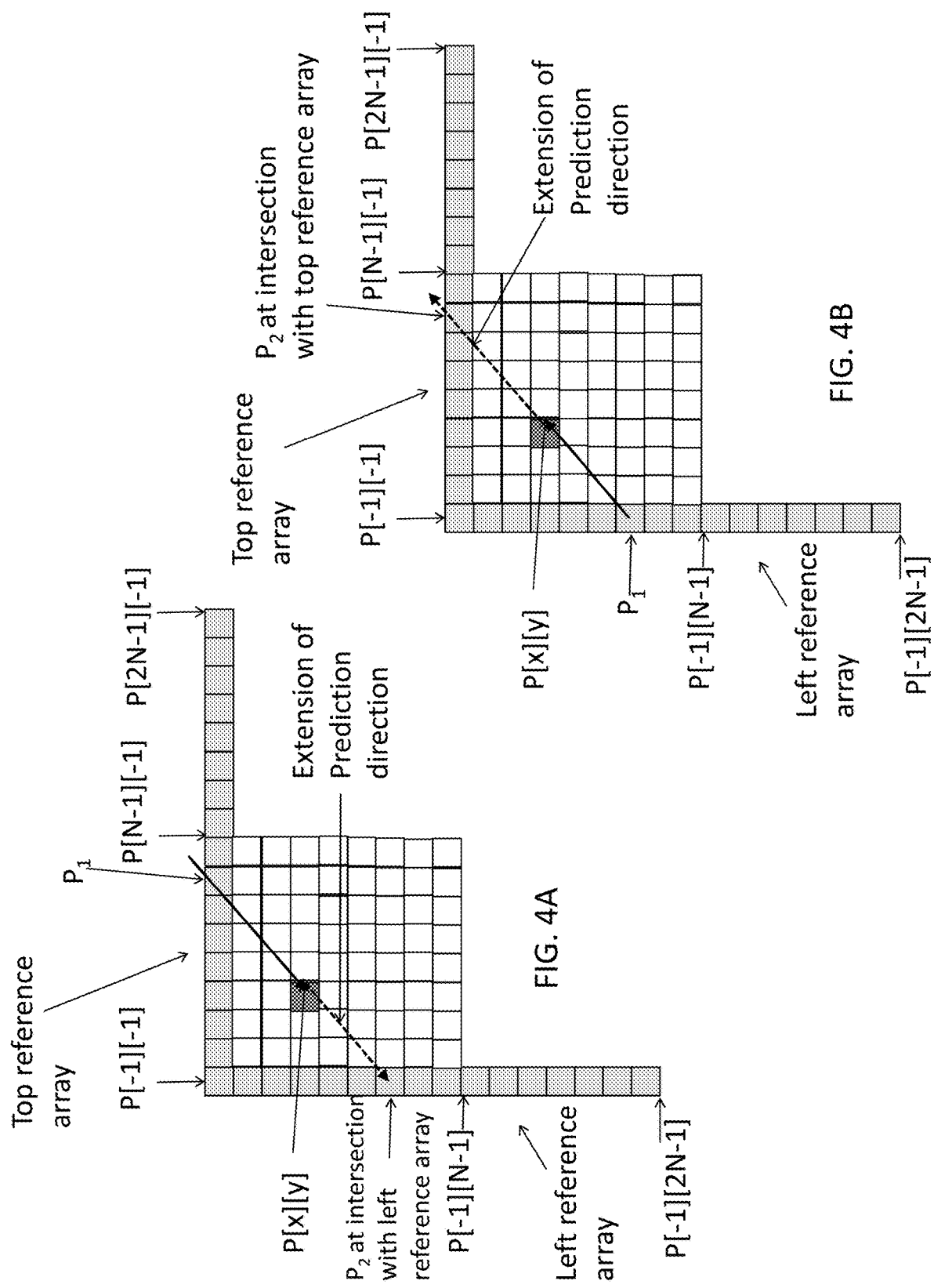
FIG. 4A is a pictorial example depicting the bi-directional intra prediction in positive vertical direction from a top reference array and a left reference array.
FIG. 4B is a pictorial example depicting the bi-directional intra prediction in positive horizontal direction from a top reference array and a left reference array.

In bi-directional intra prediction, as shown in FIG. 4A and FIG. 4B, the prediction direction is extended on the opposite side to obtain the second reference sample for a target pixel P[x][y]. The second reference sample is located on a second reference array (that is, an array which does not contain the first reference sample). With two reference samples, instead of simply copying the first reference sample as done in HEVC, a value is interpolated at the target pixel location and use as the predicted value.

As an example shown in FIG. 4A, a predicted value for the target sample P[x][y] is obtained by interpolating between predictor sample $P_1$ from the top reference array and predictor sample $P_2$ from left reference array. The predictor sample $P_2$ is in the left reference array substantially at the intersection with the direction prediction line given by an intra directional prediction.

As another example shown in FIG. 4B, a predicted value for the target sample P[x][y] is obtained by interpolating between predictor sample $P_1$ from the left reference array and predictor sample $P_2$ from top reference array. The predictor sample $P_2$ is in the top reference array substantially at the intersection with the direction prediction line given by an intra directional prediction.

Given that the reference arrays have finite size of 2N samples, for some prediction directions, it is not possible to have a second reference sample from the other reference array for some target pixels since the extension of the prediction direction will not intersect the other reference array. In those cases, in a first embodiment, the second reference sample is estimated by repeating the last sample value of the other reference array beyond the array. For example, in the case of FIG. 4A, for any target pixel, if the second predictor falls beyond the length of the left reference array, we just use the last left reference sample, that is, the sample P[−1][N−1]. The left reference array is extended below as much as required.

According to another embodiment, in those cases wherein it is not possible to have a second reference sample from the other reference array for some target pixels, the second reference sample is estimated using reference samples on the existing two reference arrays. For example, a larger reference array is constructed wherein unknown samples are estimated from reference samples of top and left reference arrays. For example, in the case of FIG. 4A, interpolation is performed for estimating the samples lying in the bottom of the left reference array, i.e. from P[−1][N] to P[−1][2N−1]. Such an interpolation could be done by setting P[−1][2N−1] to the value of P[2N−1][−1] and interpolating the other left samples lying between P[−1][N−1] to P[−1][2N−1] with linear interpolation using the values of P[−1][N−1] and P[−1][2N−1].

Figures 5A, 5B:
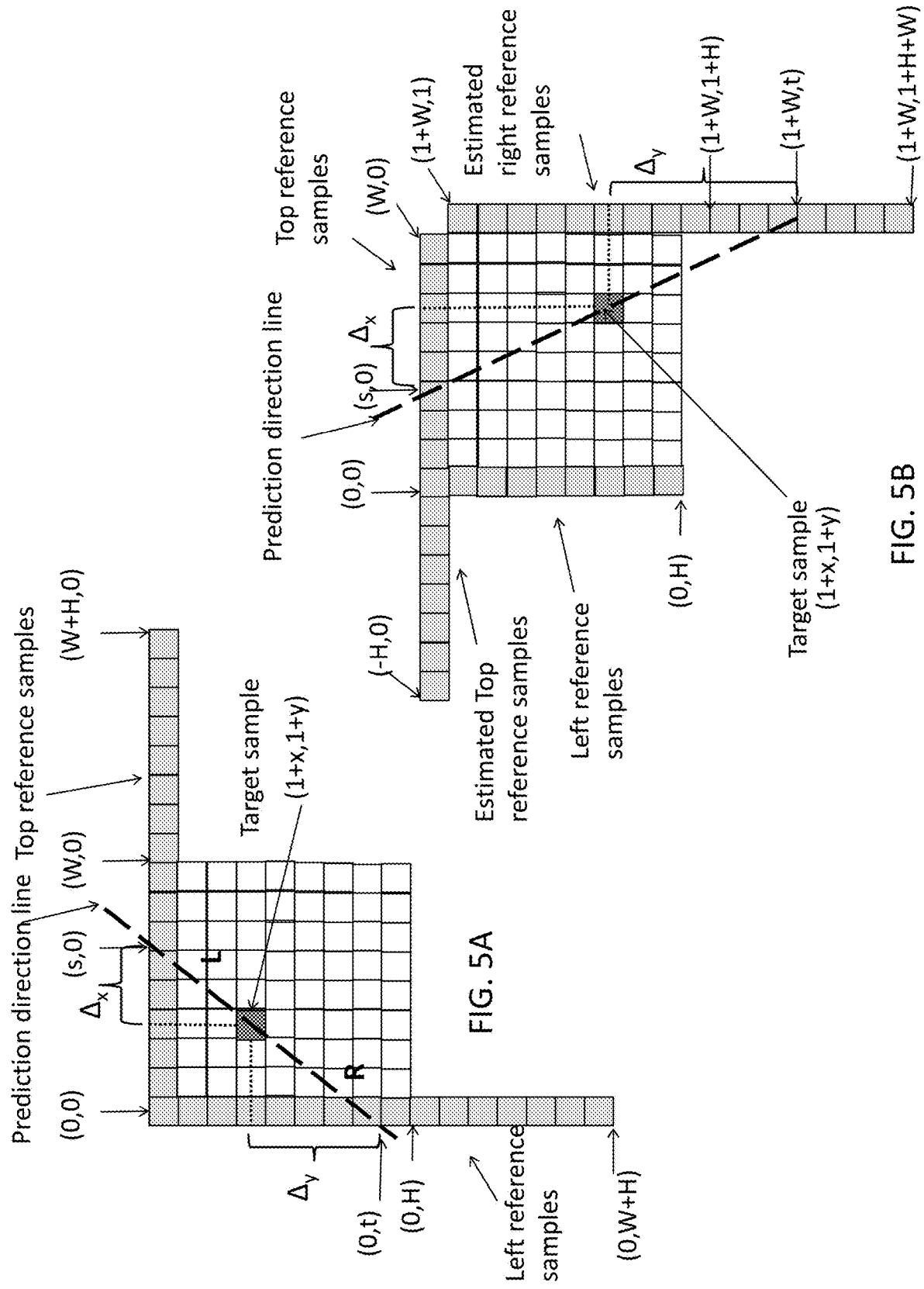
FIG. 5A is a pictorial example depicting localization of a second reference sample in bi-directional intra prediction for position direction.
FIG. 5B is a pictorial example depicting localization of a second reference sample in bi-directional intra prediction for negative direction.

Bi-directional prediction is further described referring to FIG. 5A and FIG. 5B wherein, for easier explanation, the origin of the co-ordinate system has been displaced to the location of the top-left neighbor pixel of the target block. Therefore, the origin now coincides with the first sample of the top reference array as well as the first sample of the left reference array. The pixel for which a value is to be predicted according to the present embodiment is located at (x, y), 0≤x<W, 0≤y<H, in the target block, with H being the height of the target block H and W being the width of the target block. The co-ordinate of the pixel is (1+x, 1+y) in the new co-ordinate system.

For the positive direction as shown, let (s, 0) denote the co-ordinate of the top reference sample. We will refer to the sample at (s, 0) as the first reference sample for the target pixel. The prediction direction is extended towards bottom left and intersects the left reference array at (0, t). We refer to the sample at (0, t) as the second reference sample for the target pixel.

Figure 4D:
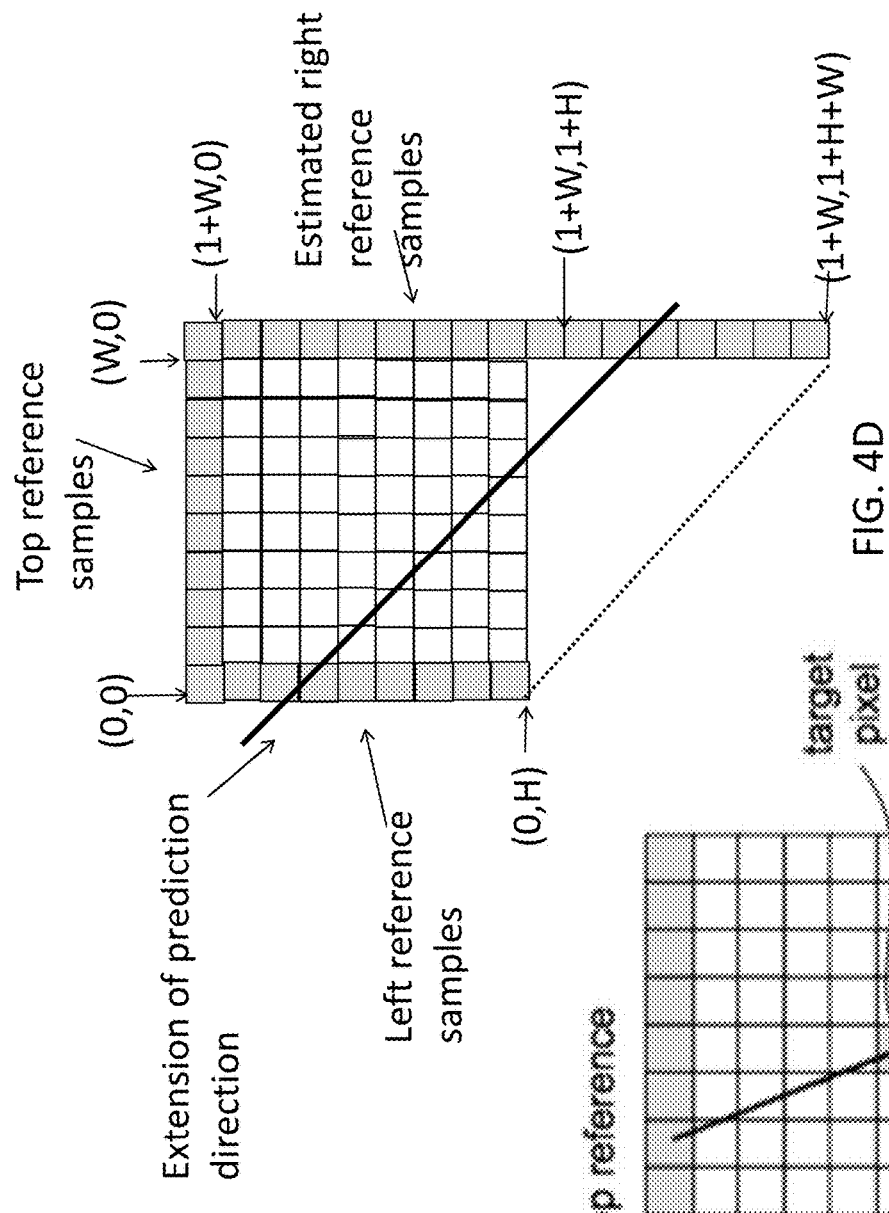
FIG. 4D is a pictorial example depicting the estimation of a right reference array for a negative vertical direction.
Figure 4C:
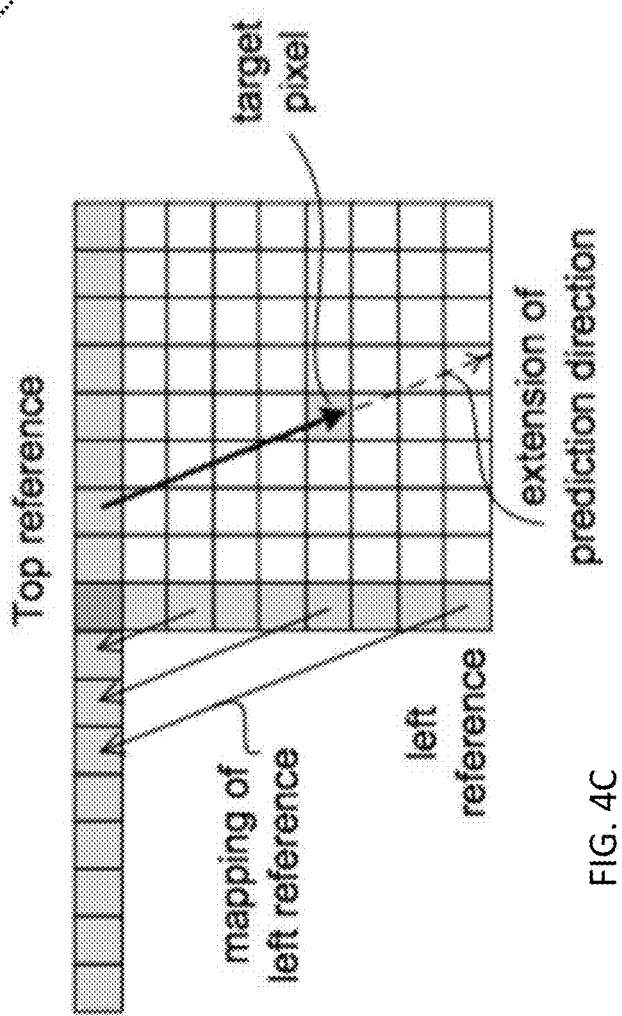
FIG. 4C is a pictorial example depicting the prediction and construction of the top reference array for a negative vertical direction.

For the negative prediction direction, as shown in FIG. 5B, (1+W, t) denotes the location of the second reference sample on a right reference array. Such a right reference array has to be estimated since no reference samples are known at the encoder or decoder for the right of the current block. In a same manner, a bottom reference array could be estimated for bi-directional intra prediction with negative prediction direction. FIG. 4D illustrates pictorial example for estimating the right reference array. Such an estimation of right and/or bottom reference arrays may be performed in manner similar as the one disclosed above for estimating unknown samples of finite length array. For example, in the case of FIG. 4D, interpolation is performed for estimating the samples lying in the right reference array, i.e. from location (1+W,0) to (1+W, 1+H+W). Such an interpolation could be done by setting the value at (1+W,0) to the same value as at location (W, 0), setting the value at (1+W,1+H+W) to the same value as at location (0, H), and interpolating the other right samples lying between (1+W,0) and (1+W, 1+H+W). with linear interpolation using the values at (1+W, 0) and (1+w, 1+H+W).

For performing bi-directional intra prediction, a first step is to determine the second predictor $P_2$. For this, it is needed to compute t. As an example, we consider the 32 angle directions from HEVC. The disclosed embodiment could also be easily applied to the JEM case with 64 intra directional prediction modes. Thus, in the case of 32 angle directions, both s and t have resolution of (1/32) of a pixel. Referring to FIG. 5A, t can be expressed as $t=1+y+\Delta_y$, where $\Delta_y$ denotes the vertical displacement of the second reference sample from the target pixel location.

Let $\Delta_x$ denote the projected displacement on the top reference. Similarly let $\Delta_y$ denote the projected displacement on the left reference. For positive prediction $\Delta_x >= 0$, and $\Delta_y \geq 0$. As we have seen earlier, for an angle parameter A, $\Delta_x$ is given as $\Delta_x=(1+y)*A$. To compute $\Delta_y$, we proceed as follows. First, using the projected displacements, we get $s=((1+x)<<5)+\Delta_x$, $t=((1+y)<<5)+\Delta_y$.
Using similarity of triangles, we get:

$$\frac{(1+y) \ll 5}{t} = \frac{\Delta_x}{s}$$

From this we get, $$t = \frac{s*((1+y) \ll 5)}{\Delta_x} = \frac{(((1+x) \ll 5)+\Delta_x)*((1+y) \ll 5)}{\Delta_x} = ((1+y) \ll 5) + \frac{(((1+x)(1+y)) \ll 10)}{\Delta_x}$$

Comparing this with the expression for t earlier, we get $$\Delta_y = \frac{((1+x)(1+y) \ll 10)}{\Delta_x}$$

Therefore, $\Delta_y$ can be computed as $$\Delta_y = \frac{(((1+x)(1+y)) \ll 10)}{\Delta_x}$$

for positive vertical directions. In a similar manner, it can be shown that $\Delta_y$ can be computed as $$\Delta_y = \frac{(((x-W)*(1+y)) \ll 10)}{\Delta_x}$$

for negative vertical directions,
where $\Delta_x$ denotes the horizontal displacement of the first reference sample from the target pixel.
For the angle parameter A, as specified by HEVC, $\Delta_x$ is already computed as $$\Delta_x=(1+y)*A;$$

In the case of positive and negative horizontal prediction directions, the above formulas remain the same since they are implemented by swapping the top reference array with the left reference array and swapping the height and width of the target block.

Once the two reference samples have been obtained, a value at the target pixel location is interpolated using the two reference samples. Linear interpolation is basically a weighted sum that will result in an intermediate value between the two reference sample values. This weighted sum can be alternatively implemented as the addition of the first reference sample to an update term. Since, in the HEVC and JEM reference codes, the prediction value is already computed using the first reference sample, the second approach is chosen for easier implementation in the reference code. If $P_1$ and $P_2$ denote the first and second reference sample values, the prediction at the pixel (1+x, 1+y) is computed as $$P[1+x][1+y] = P_1 + \Delta P, \quad (7)$$

$$\text{where } \Delta P = \frac{L}{L+R}(P_2 - P_1).$$

Here L and R denote the distances of the first and second reference samples from the target pixel, as shown in FIG. 5A and FIG. 5B. So, the ratio $$\frac{L}{L+R}$$

has to be computed tor computing the update term. It can be shown that this ratio can be calculated as $$\frac{L}{L+R} = \frac{\Delta_x}{((1+x) \ll 5)+\Delta_x} \text{ for positive directions and as}$$

$$\frac{L}{L+R} = \frac{\Delta_x}{((x-W) \ll 5)+\Delta_x} \text{ for negative directions.}$$

For both positive and negative directions, the ratio can be equivalently computed as $$\frac{L}{L+R} = \frac{((1+y) \ll 5)}{((1+y) \ll 5)+\Delta_y}.$$

In HEVC, the chroma components' prediction is dependent on the luma component prediction mode. The chroma components are tested only with 5 prediction modes for selecting the best prediction mode. The modes are PLANAR, DC, directly horizontal (mode 10), directly vertical (mode 26), and the prediction mode of the luma component, called the direct (or derived) mode. If the direct mode equals any of the previous four, that is, PLANAR, DC, directly horizontal, and directly vertical, then the vertical diagonal mode 34 substitutes that mode.

In JEM, in addition to these five prediction modes (that is, PLANAR (mode 0), DC (mode 1), directly horizontal (mode 18), directly vertical (mode 50), and the direct mode), there is a new mode called LM-CHROMA. The LM-CHROMA mode does not use any of the defined prediction modes, rather the prediction is constructed from the reconstructed luma block. In order to distinguish the direct mode from LM-CHROMA, the direct mode is called the DM_CHROMA mode. If the DM_CHROMA mode equals one of the fixed four modes (i.e., PLANAR, DC, purely horizontal, and purely vertical), then the vertical diagonal mode 66 substitutes that mode.

Furthermore, unlike in HEVC, in JEM the chroma CU partitioning is de-coupled from the luma CU partitioning in INTRA frames. Therefore, the DM_CHROMA mode may correspond to the prediction mode of a luma CU which does not spatially correspond to the chroma CU under consideration.

The bi-directional intra prediction method as described above can be applied to both luma and chroma components. The bi-directional intra prediction methods as described above are based on the physical intuition of object orientations and intensity variation in an image. They do not guarantee that the resulting RD performance will always be better than uni-directional intra prediction. Therefore, in one embodiment, we propose to include bi-directional intra prediction as an option by signaling a flag in the syntax, for example, in the SPS (Sequence Parameter Set), or PPS (Picture Parameter Set), or slice header.

In one embodiment, once bi-directional intra prediction is enabled, every INTRA CU can choose between bi-directional or uni-directional intra prediction. The choice can be signaled by a 1-bit flag at the CU level, which can be context-encoded using context 0, or a mode-dependent context.

For the chroma components, in one embodiment, we can transmit one bit signaling if the corresponding chroma CU uses bi-directional intra prediction or not, independent of the luma CU signaling. The one-bit flag can be context-encoded using either context 0, or a mode-dependent context. In another embodiment, no additional signaling is used for the chroma components' prediction. Rather, the chroma components can use the same signaling as the luma CU at the center or top-left corner of the CTU. In this embodiment, if the luma signaling flag is enabled, then the CU is predicted with bi-directional intra prediction, otherwise uni-directional angular prediction is performed.

When performing bi-directional prediction, localizing of the second reference sample and the interpolating to get the predicted value require both division operations by integers that are not always powers of two. These divisions, therefore, may pose difficulty in low-complexity fixed-point operations.

The calculations disclosed above are exact and assume certain models of objection orientation and intensity change in a frame. The localization of the second reference sample by extending the prediction direction in the opposite direction assumes that the directionality is maintained along a perfect straight-line, which need not be true in a real image. A few pixels of offset from the exact position can be tolerated in general. Secondly, the luminosity change along a certain direction need not be at all linear, especially if the block size is large. Linearity is just a first order model to capture the intensity variation. Therefore if the update values in the interpolation computation are offset by some tolerance limits, the bi-directional intra prediction method may still perform well.

Approximation in Localizing the Second Reference Sample

According to an aspect of the present disclosure, at least one embodiment is directed to a method for approximating the localization of the second reference sample.

Let us consider only the positive prediction direction since, in the case of negative prediction, the localization of the second reference sample is just the mirror replica on the right reference array. As already discussed, the displacement $\Delta_y$ along the left reference array is given as $$\Delta_y = \frac{(((1+x)(1+y)) \ll 10)}{\Delta_x}.$$

Now, replacing the value of $\Delta_x$ ($(1+y)*A$)) in the denominator and then canceling $(1+y)$ from both the numerator and the denominator, gives:

$$\Delta_y = \frac{((1+x) \ll 10)}{A} = (1+x) * \frac{1 \ll 10}{A}.$$

This can be equivalently expressed as $\Delta_y=(1+x)*Ay$; $0 \leq x < N$, for a target block of width, where $$Ay = \frac{1024}{A}.$$

It is to be noted that we have assumed here the resolution for $\Delta_x$ as given in HEVC, that is, (1/32) of a pixel, and we have assumed the same resolution for $\Delta_y$. However, other resolutions $\Delta_x$ and/or $\Delta_y$ can be used. For example, the resolution of both can be increased to (1/64) of a pixel, here the value of Ay will be $(1 \ll 12)/A$. In that case, the value of A will change corresponding to (1/64) pixel resolution.

For positive directions A has positive values. As can be seen, $\Delta_y$ is a function of x-coordinate only. This makes sense, since, for a given prediction direction, i.e. for a given A, if we move along a column inside the target block, the displacement value $\Delta_y$ will not change. Note that this is the opposite of $\Delta_x$, which changes along the vertical direction, but remains the same as we move horizontally inside the target block. However the values of A are not all powers of 2 and therefore the division operation cannot be implemented by bit-shifting operation.

FIG. 6 illustrates an exemplary method for accessing a second reference sample, according to an embodiment.

At step 600, the values of Ay are pre-calculated to the nearest integers for all positive values of A (that is all positive directions) and the values Ay are saved in a table. Such a table may computed and stored both at the encoder and decoder before any processing for encoding or decoding a picture or a video, such that the pre-computation process is performed only once during encoding and decoding. As can be seen, Ay only depends on A values.

Because of the rounding, there will be approximation errors when the tables are used for the localization of the second reference sample. Note that the rounding error will accumulate along the x-direction as the x-coordinate is increased from x=0. Experiments over the JEM code have shown that the values lie within ±2 pixels of the exact location. The values, rounded to nearest integers, are listed in Table 2 below, which shows the values of Ay in function of the parameter A in the case of HEVC.

TABLE 2

| Parameter Ay for different positive values of A in HEVC | | | | | | | |
|---|---|---|---|---|---|---|---|
| A | 2 | 5 | 9 | 13 | 17 | 21 | 26 | 32 |
| Ay | 512 | 205 | 114 | 79 | 60 | 49 | 39 | 32 |

For JEM code, which considers 67 prediction modes, the value of Ay can be similarly derived and are shown in Table 3 below.

TABLE 3

| Parameter Ay for different positive values of A in JEM | | | | | | | |
|---|---|---|---|---|---|---|---|
| A | 1 | 2 | 3 | 5 | 7 | 9 | 11 | 13 |
| Ay | 1024 | 512 | 341 | 205 | 146 | 114 | 93 | 79 |
| A | 15 | 17 | 19 | 21 | 23 | 26 | 29 | 32 |
| Ay | 68 | 60 | 54 | 49 | 45 | 39 | 35 | 32 |

At step 605, when encoding or decoding a target block in a current intra directional prediction mode having an angle parameter A, the value Ay to be used for the current block is determined using the stored table.

At step 610, for a given sample (1+x, 1+y), the displacement $\Delta_y$ along the reference array to which the second reference sample lies is determined as $A_y=(1+x)*Ay$ if the target block is encoded or decoded in a current intra directional prediction mode having a positive prediction direction. If the target block is encoded or decoded in a current intra directional prediction mode having a negative prediction direction, the displacement $\Delta_y$ is determined by $\Delta_y=(W-x)*Ay$.

At step 615, the second predictor $P_2$ is determined, i.e. the second reference sample value is determined. Let $i_y$ and $f_y$ denote the integer and the fractional parts of $A_y$. That is, $i_y=\Delta_y>>5$, and $f_y=\Delta_y$ & 31. Let $P_2$ denote the second predictor value, i.e. the value of the second reference sample. Then, if the fractional part is zero, the value of the second reference sample $P_2$ is given by ref Array[1+y+$i_y$], where refArray is the reference array wherein the second reference sample lies. For example, in the case of a bi-directional intra prediction with positive vertical direction, refArray corresponds to the left reference array. In the case of a bi-directional intra prediction with positive horizontal direction, refArray corresponds to the top reference array.

If the fractional part is not zero, then interpolation using the nearest two reference pixels is needed. In this case, the prediction direction does not pass through a reference pixel, but in between two pixels, for a given target pixel. Therefore, the value of the second reference sample $P_2$ is given by $P_2=(32-f_y)*\text{refArray}[1+y+i_y]+f_y*\text{refArray}[1+y+i_y+1]+16)>>5.$ Approximation of the Interpolation Operation when Computing the Predicted Value According to another aspect of the present disclosure, at least one embodiment is directed to a method for approximating the interpolation operation when computing the predicted value.

As disclosed above, the interpolation operation is implemented by adding an update term. The update term depends on the ratio $$\left(\frac{L}{L+R}\right)$$

and the difference between the two reference sample values.

It is easy to see that the ratio lies between 0 and 1. Therefore the update term basically adds a fractional part of the difference to the original prediction value. If the target pixel is close to the first reference sample, the ratio is close to 0 and therefore, the update term is very small. As we move closer to the second reference sample, ratio value increases towards 1 and therefore the update operation will make the prediction value closer to the second reference sample. In all cases, the update term will result in a value, which is in-between, the two reference sample values.

As discussed above, the calculation of the update term requires division operations where the denominators may not be powers of two. To avoid such divisions, these operations are approximated by using fixed ratio values that are independent of the direction. As already seen, the ratio can be computed as:

$$\frac{L}{L+R} = \frac{((1+y) \ll 5)}{((1+y) \ll 5) + \Delta_y},$$

where y denotes the y-coordinate of the target pixel.

This ratio may be approximated by:

$$\frac{L}{L+R} \approx \frac{(1+y)}{H+W},$$

where H and W are the height and width of the target block.

Let us call this model as fixed-ratio model (FM0). Even though, there is still a division operation, it is easier to implement since the height and width of a block are powers of 2 and the scaling can be done much faster by bit-shifting. For a 4×4 target block, the above ratio values at different target pixel locations (x,y) are shown below:

| | | | |
|---|---|---|---|
| 1/8 | 1/8 | 1/8 | 1/8 |
| 2/8 | 2/8 | 2/8 | 2/8 |
| 3/8 | 3/8 | 3/8 | 3/8 |
| 4/8 | 4/8 | 4/8 | 4/8 |

The ratio values for other target block sizes can be computed analogously. In this fixed-ratio approximation, the ratio is a function of only the y-coordinate.

For positive directions, another fixed-ratio model can be used as $$\frac{L}{L+R} \approx \frac{(W+y-x)}{H+W}.$$

Let us term this as fixed-ratio model 1 for positive directions (FMP1). For 4×4 and 8×8 target blocks, the ratios for different target pixel locations (neglecting the constant denominator) are shown below:

| | | | |
|---|---|---|---|
| 4 | 3 | 2 | 1 |
| 5 | 4 | 3 | 2 |
| 6 | 5 | 4 | 3 |
| 7 | 6 | 5 | 4 |

| | | | | | | | |
|---|---|---|---|---|---|---|---|
| 8  | 7  | 6  | 5  | 4  | 3 | 2 | 1 |
| 9  | 8  | 7  | 6  | 5  | 4 | 3 | 2 |
| 10 | 9  | 8  | 7  | 6  | 5 | 4 | 3 |
| 11 | 10 | 9  | 8  | 7  | 6 | 5 | 4 |
| 12 | 11 | 10 | 9  | 8  | 7 | 6 | 5 |
| 13 | 12 | 11 | 10 | 9  | 8 | 7 | 6 |
| 14 | 13 | 12 | 11 | 10 | 9 | 8 | 7 |
| 15 | 14 | 13 | 12 | 11 | 10| 9 | 8 |

To obtain the ratio for a given pixel location using the above fixed-ratio model 1 tables, each value of the above tables has to be divided by 8 for a 4×4 target block or by 16 for an 8×8 target block, or bit-shifted by 3 for a 4×4 target block or by 4 for an 8×8 target block.

As can be seen, the ratio mapping of the fixed-ratio model 1 is symmetric about the diagonal for square target pixels. For other block sizes, the tables can be deduced analogously.

Considering that JEM also uses rectangular target blocks, other fixed ratio models can be used, such as $$\frac{L}{L+R} \approx \frac{(W+H+y-x)}{2(H+W)},$$

which will have symmetric weights on the two sides of the main diagonal. Let us term this as fixed-ratio model 2 for positive directions (FMP2). As can be seen, in general, the ratio values increase along the second diagonal from the top right towards bottom left. The ratios increase along a column downwards, and decrease along a row towards the right.

For the negative prediction directions, in place of model FM0, the following fixed ratio model can be used:

$$\frac{L}{L+R} \approx \frac{(1+y+x)}{(H+W)}.$$

Let us can this model as fixed-ratio model 1 for negative directions (FMN1). This model follows the properties given earlier, i.e. the values should be between 0 and 1 and they should be increasing from a value close to 0 towards a higher value as we move from the first reference sample (which lie on the top reference array for negative prediction directions) towards the second reference sample (which lie on the right reference array for negative prediction directions).

For 4×4 and 8×8 target blocks, the ratios for different target pixel locations (neglecting the constant denominator) are shown below:

| 1 | 2 | 3 | 4 |
|---|---|---|---|
| 2 | 3 | 4 | 5 |
| 3 | 4 | 5 | 6 |
| 4 | 5 | 6 | 7 |

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

As we see, here the ratios increase along the principal diagonal from the top left towards bottom right. They also increase along rows and columns.

These fixed ratio models will not give us exact interpolation values. The interpolated values close to the second reference samples, for example, need not be very close to them, and may be offset by certain magnitude. The post-filtering in HEVC will make these values further closer to the second reference samples. In all cases, the interpolated values will always lie in-between the two reference sample values.

Experiments have shown that positive directions give better performance than negative directions in terms of RD cost. Regarding the use of the interpolation tables, the first model (FM0), which applies to both positive and negative directions, has the worst performance with a loss of about 0.15% from the implementation with exact calculation, i.e. with floating point operations. Either FMP1 or FMP2 for positive directions together with FMN1 for negative directions has a performance loss of about 0.05%. Therefore, the loss due to the approximation of the interpolation using fixed-point operations is very small compared to the complexity reduction the above approximations provides compared to the floating-point operations complexity.

In an embodiment, interpolation is performed only for strictly positive angular prediction modes. We use the Table 3 for the localization of the second reference sample for each target pixel. For interpolation, we use any fixed-ratio model, for example, FM0, or, FMP1, or FMP2. The proposed bi-directional prediction is not forced for all blocks having positive prediction modes, but is included as an option since it does not guarantee to produce better RD performance than the normal uni-directional prediction. Therefore, for a block with positive prediction direction, both the unidirectional and bi-directional predictions are performed at the encoder and the one giving better RD performance is chosen. The chosen prediction method is signaled to the decoder using a 1-bit flag. A value of 1 for this flag indicates bi-directional prediction and the value 0 indicates the usual uni-directional prediction. The 1-bit flag which is context encoded using context 0, or a mode-dependent or neighborhood-dependent context, for instance as in an CABAC entropy encoder (Context Adaptive Binary Arithmetic Coder). For planar and DC prediction modes, purely vertical and purely horizontal modes, and prediction modes associated with negative directions, no signaling is applied since we do not apply interpolation for these modes. The decoder decodes this flag after decoding the prediction mode of a block. For the chroma Coding Unit (CU), the signaling flag used with the center luma CU is used to decide whether to perform interpolation with the DM_Chroma mode. If the center luma CU has bi-directional prediction, meaning the flag has value 1, then the same is assumed for the chroma CU if its prediction mode is positive. If the prediction mode is not DM_Chroma, then the uni-directional intra prediction is used.

According to another embodiment, we perform interpolation only for strictly negative angular prediction modes. We use the Table 3 for the localization of the second reference sample for each target pixel. For interpolation, we use any fixed-ratio model, for example, FM0 or FMN1. For signaling the interpolation, we use a 1-bit flag which is context encoded using context 0, or a mode-dependent or neighborhood-dependent context. For planar and DC prediction modes, for purely vertical and purely horizontal modes, and prediction modes associated with positive directions, no signaling is applied since we do not apply interpolation for these modes. For the chroma CU, the signaling flag used with the center luma CU is used to decide if to perform interpolation with the DM_Chroma mode. If the prediction mode is not DM_Chroma, then the uni-directional intra prediction is used.

According to another embodiment, we perform interpolation both for strictly positive and strictly negative angular prediction modes. We use the Table 3 for the localization of the second reference sample for each target pixel. For interpolation, we use any fixed-ratio model, (for example, FM0, or FMP1, or FMP2 for positive directions, FM0 or FMN1 for negative directions). For signaling the interpolation, we use a 1-bit flag which is context encoded using context 0, or a mode-dependent or neighborhood-dependent context. For planar and DC prediction modes, and purely vertical and purely horizontal modes, no signaling is applied since we do not apply interpolation for these modes. For the chroma CU, the signaling flag used with the center luma CU is used to decide if to perform interpolation with the DM_Chroma mode. If the prediction mode is not DM_Chroma, then the uni-directional intra prediction is used.

According to another embodiment, we perform interpolation both for strictly positive and strictly negative angular prediction modes. We use the Table 3 for the localization of the second reference sample for each target pixel. For interpolation, we use any fixed-ratio model, (for example, FM0, or FMP1, or FMP2 for positive directions, FM0 or FMN1 for negative directions). For signaling the interpolation, we use a 1-bit flag which is context encoded using context 0, or a mode-dependent or neighborhood-dependent context. For planar and DC prediction modes, and purely vertical and purely horizontal modes, the signaling bit is set to 0 to indicate no interpolation for these modes. The decoding of the flag is thus independent of the intra prediction mode used for encoding the current block. Therefore, the decoder can thus parse the flag without waiting for the decoding of the prediction mode to be finished. This has some speed advantages in hardware implementation. For the chroma CU, the signaling flag used with the center luma CU is used to decide if to perform interpolation with the DM_Chroma mode. If the prediction mode is not DM_Chroma, then the uni-directional intra prediction is used.

According to a variant of any one of the embodiments disclosed above, we also transmit a signaling flag for the chroma components to indicate interpolation for chroma independent of luma. The signaling flag for the chroma components is context-encoded using context 0, or a mode-dependent or neighborhood-dependent context.

According to another variant of any one of the embodiments disclosed above, the option of adding interpolation is signaled in the slice header indicating that all CUs in a slice can use interpolation option. Thus, encoder can apply bi-directional prediction to selected slices.

According to another variant of any one of the embodiments disclosed above, the option of adding interpolation is signaled in the PPS header indicating that all CUs in a frame can use interpolation option. Thus, encoder can apply bi-directional prediction to selected frames.

According to another variant of any one of the embodiments disclosed above, the option of adding interpolation is signaled in the SPS header indicating that all frames in the sequence can use the interpolation option. Thus, encoder can indicate the use of bi-directional prediction for all frames of a sequence.

FIG. 7A illustrates an exemplary method 700 for performing bi-directional intra prediction for a vertical positive prediction direction for a current block, according to an embodiment. Method 700 can be implemented at the encoder and decoder. Generally, the same reference array should be constructed or estimated, and the same interpolation method should be used, at both the encoder and decoder such that a bitstream generated by the encoder can be properly decoded by the decoder.

In method 700, an encoder or decoder constructs (710) a top reference array, for example, using Eq. (1). At step 720, the encoder or decoder constructs (720) a left reference array for example using Eq. (2). For a target pixel, the first predictor value $P_1$ can be determined (730), along the prediction line, from the top reference array, for example, using Eq. (3) or (5).

At step 740, the second predictor value $P_2$ is obtained from the left reference array for example using the method disclosed in FIG. 6.

At step 750, the target pixel then can be predicted based on both predictor values $P_1$ and $P_2$, for example, using Eq. (7).

The encoder or decoder checks (760) whether more samples need to be predicted in the block. If yes, the control returns to step 730. Otherwise, bi-directional intra prediction for the current block is completed for the given vertical positive prediction direction.

According to another embodiment, at step 750, when using Eq. (7), any one of the embodiments disclosed above giving an approximation of the ratio $$\frac{L}{L+R}$$

may be used, such as FM0, FMP1, FMP2.

Accordingly, when bi-directional intra prediction for a negative prediction direction for a current block is performed, at step 750, when using Eq. (7), any one of the embodiments disclosed above giving an approximation of the ratio $$\frac{L}{L+R}$$

may be used, such as FM0, FMN1.

FIG. 7B illustrates an exemplary method 7000 for performing bi-directional intra prediction for a current block, according to another embodiment. One particular embodiment includes: (i) accessing (7010), based on a directional intra prediction mode having a direction, a first predictor $P_1$ for a sample, the sample being within the current block, (ii) accessing (7020), based on the directional intra prediction mode, a second predictor $P_2$ for the sample, the first and second predictors being on a line at least approximating said direction associated with the directional intra prediction mode, and (iii) predicting (7030) a sample value of the sample, by using the first and second predictors. The encoder or decoder checks (7040) whether more samples need to be predicted in the current block. If yes, the control returns to step 7010. Otherwise, bi-directional intra prediction for the current block is completed for the directional intra prediction mode.

Figure 8:
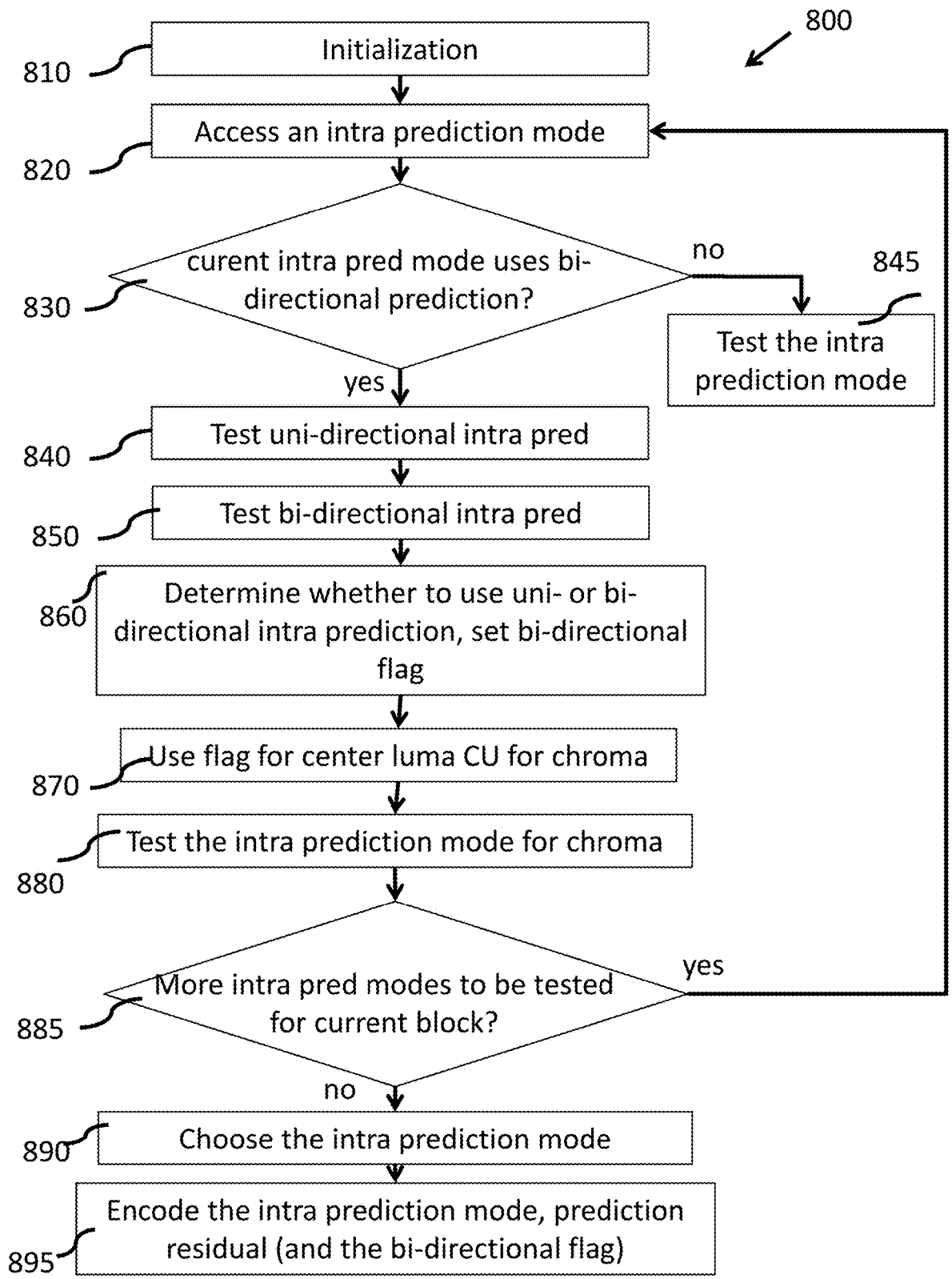
FIG. 8 illustrates an exemplary method of video encoding with bi-directional intra prediction, according to an embodiment.

FIG. 8 illustrates an exemplary method 800 for encoding with bi-directional intra prediction, according to an embodiment. Method 800 may accept a video sequence to be encoded as input. At initialization step 810, the encoder may decide whether bi-directional intra prediction is to be used for encoding the video sequence and which prediction modes may use bi-directional intra prediction. For example, the encoder may signal in the slice header, PPS, or SPS, that all CUs in a slice, picture, sequence, respectively, can use the bi-directional intra prediction option.

At step 820, the encoder accesses the current intra prediction mode to be tested. The encoder checks (830) whether the current intra prediction mode belongs to the set of prediction modes that may use bi-directional prediction. For example, bi-directional prediction may be set only for prediction mode having a positive direction, or prediction mode having a negative direction, or prediction mode having either a negative or a positive.

If bi-directional intra prediction is not to be used, the encoder tests (845) the intra prediction mode for the block using uni-directional intra prediction, for example, as in HEVC. Otherwise, if bi-directional intra prediction may be used, the encoder tests (840) the intra prediction mode for the luma component with uni-directional intra prediction, for example, performing intra prediction as in HEVC, and the encoder also tests (850) the intra prediction mode for the luma component with bi-directional intra prediction. For example, by performing bi-direction intra prediction using method 700 or using method 7000 and various embodiments as described above and calculating the RD cost. The test may be done by computing the RD cost. Based on the coding performance, the encoder determines (860) whether to use bi-directional intra prediction for the current intra prediction mode, and a bi-directional flag is set to 0 or 1 based on the choice of uni- and bi-directional prediction.

For the chroma components, the encoder may determine (870) whether to use bi-directional intra prediction based on the bi-directional flag for the center luma CU for DM_CHROMA mode. If there is no directional flag for the luma CU (because its prediction mode does not fall in the set of modes that use bi-directional prediction), a default value of 0 is used indicating the uni-directional prediction.

The current intra prediction mode is then tested (880) for the chroma components. The encoder checks (885) whether more intra prediction modes are to be tested for the current block. If yes, the control returns to step 820. Otherwise, the encoder chooses (890) the best intra prediction mode to be used based on the testing results (e.g., choosing the one with the smallest RD cost among different intra prediction modes). The intra prediction mode and prediction residual are then encoded (890).

If the intra prediction mode is from the set of intra prediction modes that may use bi-directional intra prediction, the bi-directional flag is also encoded (895), for example, context encoded with context 0, or a mode-dependent context. The encoding process can also be repeated for other blocks that use intra coding.

In the above, method 800 may uses any one of the embodiments of approximating the ratio when interpolating a prediction value for a target sample of the current block in bi-directional prediction.

Figure 9:
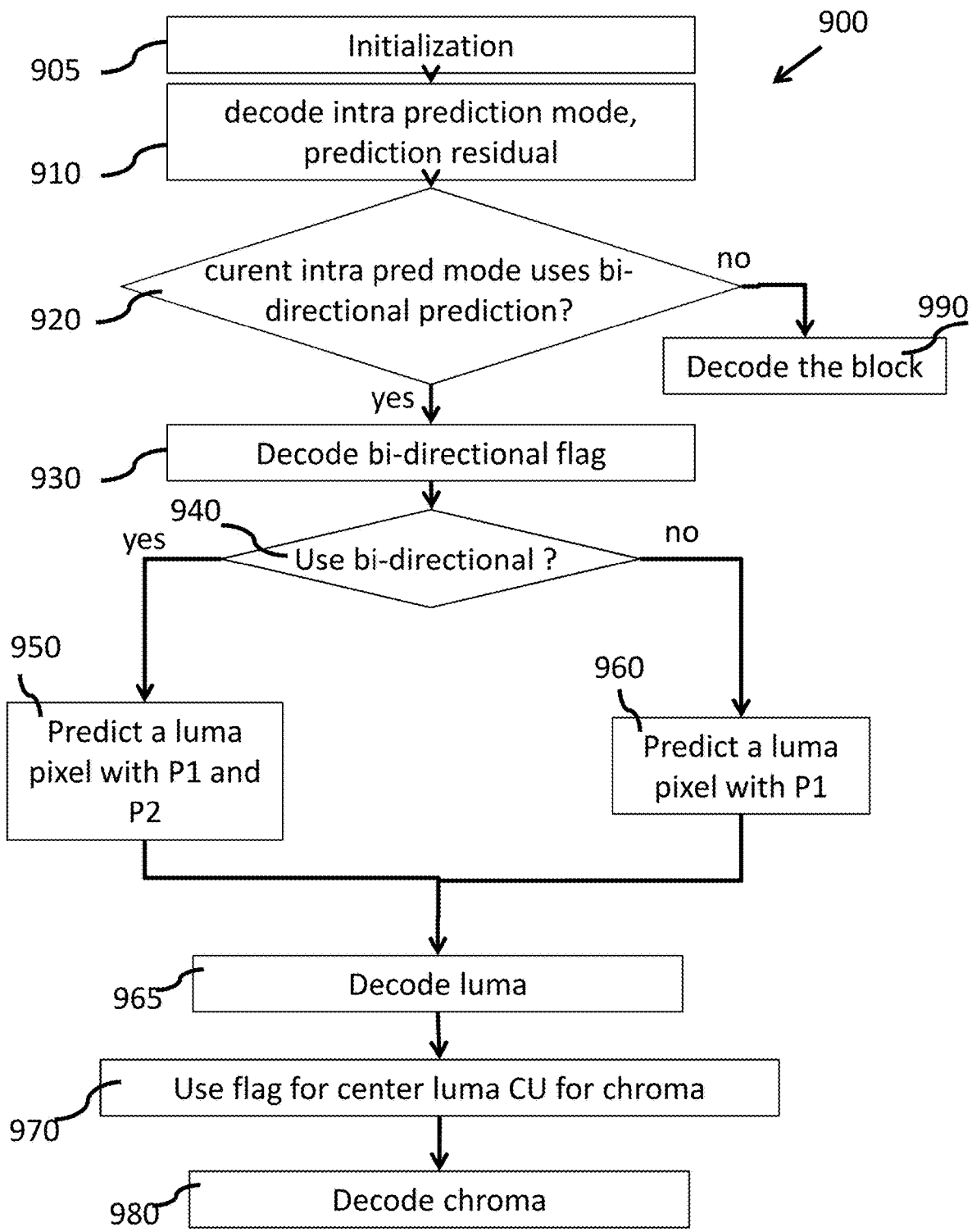
FIG. 9 illustrates an exemplary method of video decoding with bi-directional intra prediction, according to an embodiment.

FIG. 9 illustrates an exemplary method 900 for decoding with bi-directional intra prediction, according to an embodiment. Method 900 may accept a bitstream to be decoded as input, for example, use the output of method 800 as input. At initialization step 905, the decoder may decide whether bi-directional intra prediction is to be used for decoding the video sequence and which prediction modes may use bi-directional intra prediction.

At step 910, the decoder decodes the intra prediction mode for the current block. The decoder checks (920) whether the intra prediction mode belongs to the selected set of prediction modes that may use bi-directional prediction. If bi-directional intra prediction is not to be used, the decoder decodes (990) the block using uni-directional prediction. Otherwise, if bi-directional intra prediction may be used, the decoder decodes (930) a bi-directional flag indicating (940) whether uni-directional or bi-directional intra prediction is used for the current block. The decoder decodes the bi-directional flag only if the prediction mode belongs to the selected set. If the prediction mode does not belong to the set, the decoder does not decode the signaling flag and a default value of zero is assumed for the bi-directional flag.

If uni-directional prediction is used, the decoder preforms (960) uni-directional intra prediction, for example, performing intra prediction as in HEVC. If bi-directional prediction is used, the decoder performs (950) bi-directional intra prediction using, for example, method 700 or method 7000 and various embodiments as described above. Using the prediction and prediction residuals, the current block can be decoded (965).

For the chroma components, the decoder may determine (970) whether to use bi-directional intra prediction based on the bi-directional flag for the center luma CU. The chroma components are then decoded (980). In another embodiment, the signaling flag for the chroma components can be context-encoded with a mode-dependent context. The decoding process can be repeated for other blocks that use intra coding.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the precision of prediction direction (¹⁄₃₂), or the length of reference array (W, H, W+H, or 1+W+H). It should be noted that the specific values are for exemplary purposes and the present embodiments are not limited to these specific values.

In the above, various embodiments are described with respect to HEVC, or JVET based on the HEVC standard. For example, various methods of bi-directional intra prediction as described above can be used to modify the intra prediction module (160, 360) of the JVET or HEVC encoder and decoder as shown in FIG. 1 and FIG. 2. However, the present embodiments are not limited to JVET or HEVC, and can be applied to other standards, recommendations, and extensions thereof.

Various embodiments in this application use first and second predictors from columns and/or rows that are adjacent to a block in an image that is being encoded or decoded. In other embodiments, however, the two predictors are taken from (i) other locations in the image that are not in rows or columns adjacent to the block, or (ii) other images. Such other images include, for example, a reference image, a different view, and/or an image with a different temporal value such as, for example, a previous image or a successive image in time sequence.

Various embodiments in this application include rounding a number to the nearest integer. In variations of those embodiments, the rounding is rounding-up to the next higher integer and/or rounding-down to the next lower integer.

Figure 10:
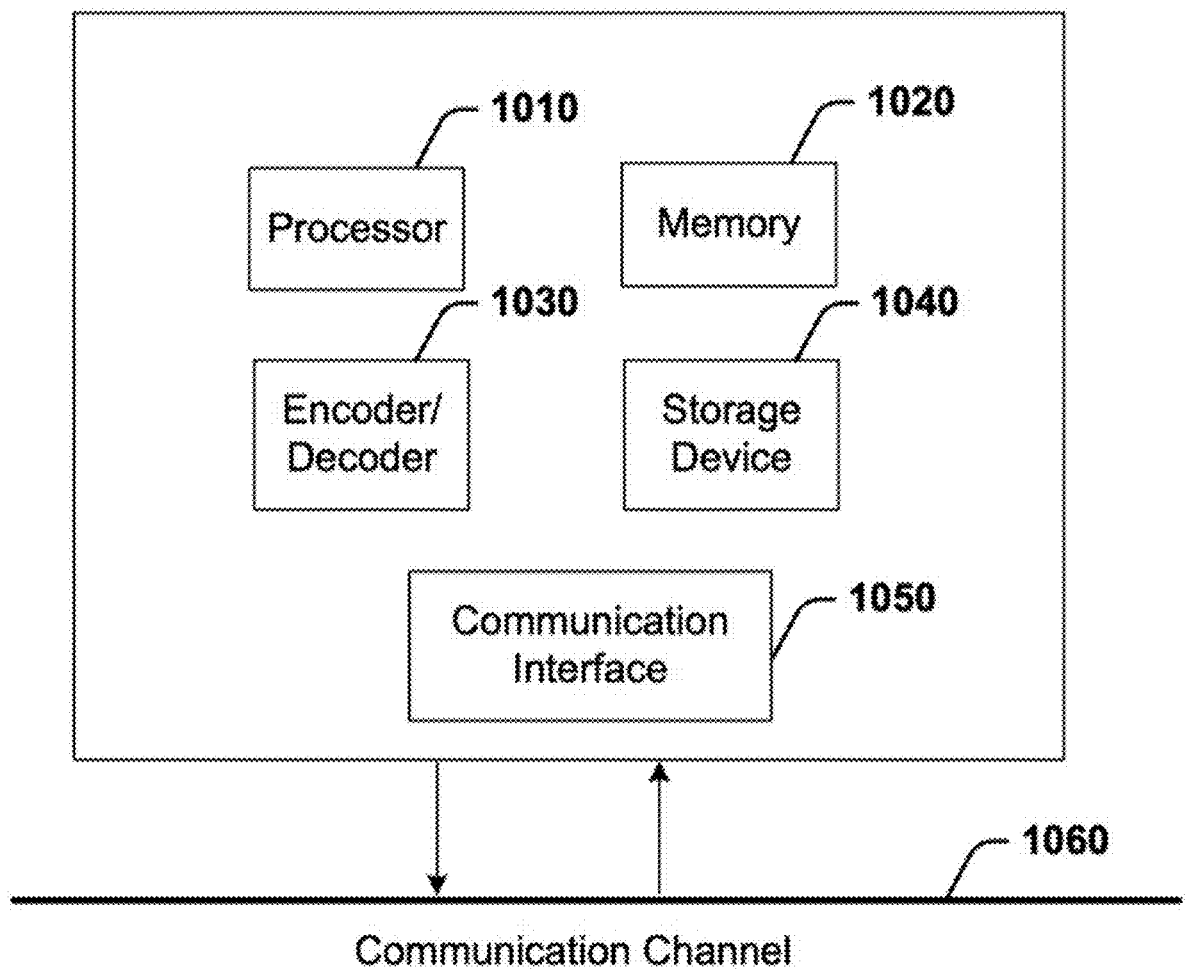
FIG. 10 illustrates a block diagram of an exemplary system in which various aspects of the exemplary embodiments may be implemented.

FIG. 10 illustrates a block diagram of an exemplary system in which various aspects of the exemplary embodiments may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1000 may be communicatively coupled to other similar systems, and to a display via a communication channel as shown in FIG. 10 and as known by those skilled in the art to implement the exemplary video system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1020, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include an encoder/decoder module 1030 configured to process data to provide an encoded video or decoded video.

Encoder/decoder module 1030 represents the module(s) that may be included in a device to perform the encoding and/or decoding functions. As is known, a device may include one or both of the encoding and decoding modules. Additionally, encoder/decoder module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments, one or more of the processor(s) 1010, memory 1020, storage device 1040 and encoder/decoder module 1030 may store one or more of the various items during the performance of the processes discussed herein above, including, but not limited to the input video, the decoded video, the bitstream, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments may be carried out by computer software implemented by the processor 1010 or by hardware, or by a combination of hardware and software. As a non-limiting example, the exemplary embodiments may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:
1. A method for video decoding, comprising:
 decoding a directional intra prediction mode for a block of a picture in a video, said directional intra prediction mode having a direction;
 accessing, based on said directional intra prediction mode, a first predictor for a sample, the sample being within said block;

accessing, based on said directional intra prediction mode, a second predictor for said sample, said first and second predictors being on a line at least approximating said direction;

predicting a sample value of said sample, by interpolation using said first and second predictors, wherein said interpolation is responsive to a difference between said second predictor and said first predictor, wherein said difference is scaled by at least a ratio, wherein said ratio is based on a location of said sample in said block, and wherein a denominator of said ratio is a power of two regardless of said location of said sample; and decoding said sample of said block based on said predicted sample value.

2. The method of claim 1, wherein said first predictor and said second predictor are on opposite sides of said sample along said line.

3. The method of claim 1, wherein said ratio is further based on at least one of W and H, where W is a width of said block and H is a height of said block.

4. The method of claim 3, wherein said denominator of said ratio is based on said at least one of W and H.

5. The method of claim 1, wherein said ratio is based on y and is independent of x, wherein x and y respectively indicate a horizontal location and a vertical location of said sample in said block.

6. The method of claim 1, wherein said ratio is based on both x and y, wherein x and y respectively indicate a horizontal location and a vertical location of said sample in said block.

7. A method for video encoding, comprising:

accessing a directional intra prediction mode for a block of a picture in a video, said directional intra prediction mode having a direction;

accessing, based on said directional intra prediction mode, a first predictor for a sample, the sample being within said block;

accessing, based on said directional intra prediction mode, a second predictor for said sample, said first and second predictors being on a line at least approximating said direction;

predicting a sample value of said sample, by interpolation using said first and second predictors, wherein said interpolation is responsive to a difference between said second predictor and said first predictor, wherein said difference is scaled by at least a ratio, wherein said ratio is based on a location of said sample in said block, and wherein a denominator of said ratio is a power of two regardless of said location of said sample; and encoding said sample of said block based on said predicted sample value.

8. The method of claim 7, wherein said ratio is further based on at least one of W and H, where W is a width of said block and H is a height of said block.

9. The method of claim 7, wherein said ratio is based on y and is independent of x, wherein x and y respectively indicate a horizontal location and a vertical location of said sample in said block.

10. The method of claim 7, wherein said ratio is based on both x and y, wherein x and y respectively indicate a horizontal location and a vertical location of said sample in said block.

11. An apparatus for video decoding, comprising one or more processors, wherein said one or more processors are configured to:

decode a directional intra prediction mode for a block of a picture in a video, said directional intra prediction mode having a direction;

access, based on said directional intra prediction mode, a first predictor for a sample, the sample being within said block;

access, based on said directional intra prediction mode, a second predictor for said sample, said first and second predictors being on a line at least approximating said direction;

predict a sample value of said sample, by interpolation using said first and second predictors, wherein said interpolation is responsive to a difference between said second predictor and said first predictor, wherein said difference is scaled by at least a ratio, wherein said ratio is based on a location of said sample in said block, and wherein a denominator of said ratio is a power of two regardless of said location of said sample; and decode said sample of said block based on said predicted sample value.

12. The apparatus of claim 11, wherein said first predictor and said second predictor are on opposite sides of said sample along said line.

13. The apparatus of claim 11, wherein said ratio is further based on at least one of W and H, where W is a width of said block and H is a height of said block.

14. The apparatus of claim 13, wherein said denominator of said ratio is based on said at least one of W and H.

15. The apparatus of claim 11, wherein said ratio is based on y and is independent of x, wherein x and y respectively indicate a horizontal location and a vertical location of said sample in said block.

16. The apparatus of claim 11, wherein said ratio is based on both x and y, wherein x and y respectively indicate a horizontal location and a vertical location of said sample in said block.

17. An apparatus for video encoding, comprising one or more processors, wherein said one or more processors are configured to:

access a directional intra prediction mode for a block of a picture in a video, said directional intra prediction mode having a direction;

access, based on said directional intra prediction mode, a first predictor for a sample, the sample being within said block;

access, based on said directional intra prediction mode, a second predictor for said sample, said first and second predictors being on a line at least approximating said direction;

predict a sample value of said sample, by interpolation using said first and second predictors, wherein said interpolation is responsive to a difference between said second predictor and said first predictor, wherein said difference is scaled by at least a ratio, wherein said ratio is based on a location of said sample in said block, and wherein a denominator of said ratio is a power of two regardless of said location of said sample; and encode said sample of said block based on said predicted sample value.

18. The apparatus of claim 17, wherein said ratio is further based on at least one of W and H, where W is a width of said block and H is a height of said block.

19. The apparatus of claim 17, wherein said ratio is based on y and is independent of x, wherein x and y respectively indicate a horizontal location and a vertical location of said sample in said block.

20. The apparatus of claim 17, wherein said ratio is based on both x and y, wherein x and y respectively indicate a horizontal location and a vertical location of said sample in said block.

* * * * *

UNITED STATES PATENT AND TRADEMARK OFFICE
CERTIFICATE OF CORRECTION

PATENT NO.         : 11,212,554 B2
APPLICATION NO.    : 17/114103
DATED              : December 28, 2021
INVENTOR(S)        : Gagan Rath et al.

Page 1 of 1

It is certified that error appears in the above-identified patent and that said Letters Patent is hereby corrected as shown below:

In the Specification

1. At Column 12, Line 55, "1+w" should read --1+W--.

2. At Column 14, Line 15, "tor" should read --for--.

3. At Column 17, Line 5, "Ay" should read --$\Delta y$--.

4. At Column 17, Line 13, "Ay" should read --$\Delta y$--.

5. At Column 17, Line 17, "ref Array" should read --refArray--.

6. At Column 17, Line 29, "P2=(32" should read --P2=((32"--.

7. At Column 19, Line 1, "nave" should read --have--.

8. At Column 19, Line 14, "can" should read --call--.

Signed and Sealed this
Eleventh Day of October, 2022

Katherine Kelly Vidal
*Director of the United States Patent and Trademark Office*